US009014062B2

(12) United States Patent
Ahn et al.

(10) Patent No.: US 9,014,062 B2
(45) Date of Patent: Apr. 21, 2015

(54) METHOD FOR HARQ AND LINK ADAPTATION OF DEVICE TO DEVICE LINK IN DIRECT COMMUNICATION BETWEEN USER EQUIPMENTS AND RELAYING BY USER EQUIPMENT

(75) Inventors: Jae Young Ahn, Daejeon (KR); Tae Gyun Noh, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/337,646

(22) Filed: Dec. 27, 2011

(65) Prior Publication Data
US 2012/0163252 A1 Jun. 28, 2012

(30) Foreign Application Priority Data
Dec. 27, 2010 (KR) ................. 10-2010-0135214

(51) Int. Cl.
| | |
|---|---|
| *H04J 3/00* | (2006.01) |
| *H04W 52/58* | (2009.01) |
| *H04L 1/00* | (2006.01) |
| *H04L 1/18* | (2006.01) |
| *H04W 52/48* | (2009.01) |
| *H04L 5/14* | (2006.01) |

(52) U.S. Cl.
CPC ............ *H04W 52/58* (2013.01); *H04L 1/0003* (2013.01); *H04L 1/0009* (2013.01); *H04L 1/0019* (2013.01); *H04L 1/0027* (2013.01); *H04L 1/1867* (2013.01); *H04L 5/1453* (2013.01); *H04L 5/1461* (2013.01); *H04L 5/1469* (2013.01); *H04L 2001/0097* (2013.01); *H04W 52/48* (2013.01)

(58) Field of Classification Search
CPC ................................................. H04W 74/00
USPC ........................................................ 370/280
See application file for complete search history.

(56) References Cited

U.S. PATENT DOCUMENTS

| | | | |
|---|---|---|---|
| 2009/0017861 | A1 | 1/2009 | Wu et al. |
| 2009/0111506 | A1 | 4/2009 | Laroia et al. |
| 2009/0221325 | A1* | 9/2009 | Periyalwar et al. ......... 455/552.1 |
| 2012/0093098 | A1* | 4/2012 | Charbit et al. ................ 370/329 |
| 2012/0106517 | A1* | 5/2012 | Charbit et al. ................ 370/336 |
| 2013/0150051 | A1* | 6/2013 | Van Phan et al. ............. 455/437 |

FOREIGN PATENT DOCUMENTS

| | | |
|---|---|---|
| KR | 1020100039404 | 4/2010 |
| KR | 1020100085153 | 7/2010 |
| WO | 2010/082084 A1 | 7/2010 |

* cited by examiner

*Primary Examiner* — Chi H Pham
*Assistant Examiner* — Fahmida Chowdhury
(74) *Attorney, Agent, or Firm* — Nelson Mullins Riley & Scarborough LLP

(57) ABSTRACT

Provided is a method of processing hybrid automatic repeat request (HARQ) and adaptive transmission of a device-to-device (D2D) link. In the method, an operation method of user equipment (UE) includes (a) receiving an initial transmission mode (TM) and transmission power for the D2D link from a base station, and performing data transmission through the D2D link, (b) determining, at the UE, a TM and transmission power of a succeeding subframe, or receiving a TM control value and a transmission power control value from counterpart UE of the D2D link and determining the TM and the transmission power of the succeeding subframe, and (c) performing the data transmission to the counterpart UE using the determined TM and transmission power. Here, (b) and (c) are repeated.

13 Claims, 6 Drawing Sheets

METHOD FOR HARQ AND LINK ADAPTATION OF DEVICE TO DEVICE LINK IN DIRECT COMMUNICATION BETWEEN USER EQUIPMENTS AND RELAYING BY USER EQUIPMENT

CLAIM FOR PRIORITY

This application claims priority to Korean Patent Application No. 10-2010-0135214 filed on Dec. 27, 2010 in the Korean Intellectual Property Office (KIPO), the entire contents of which are hereby incorporated by reference.

BACKGROUND

1. Technical Field

Example embodiments of the present invention relate in general to direct communication between user equipment (UE) and UE relaying, and more particularly, to a method of processing adaptive transmission and hybrid automatic repeat request (HARQ) of a device-to-device (D2D) link in order to perform direct communication between UE and UE relaying.

2. Related Art

Direct communication between UE is a communication method in which two adjacent sets of UE perform direct data transmission and reception without passing through a base station. In other words, the two adjacent sets of UE communicate as a source and a destination of data, respectively.

Direct communication between UE can be performed according to a communication scheme using an unlicensed band of a wireless local area network (WLAN), such as Institute of Electrical and Electronics Engineers (IEEE) 802.11, Bluetooth, or so on. However, in the communication scheme using such an unlicensed band, it is difficult to provide a planned and controlled service. In particular, the performance of the communication scheme may drastically deteriorate due to interference.

On the other hand, direction communication between UE provided by a wireless communication system using a licensed band or a television (TV) white space band employed in an environment in which interference between systems is controlled, can support quality of service (QoS), enhance frequency use efficiency through frequency reuse, and increase a communication distance.

On the other hand, UE relay communication is a communication method in which, to increase the transmission capacity of UE (UE A) present at a cell boundary or shadow region, neighboring UE (UE B) having a good link characteristic with a neighboring base station, that is, present relatively close to the base station or outside the shadow region, serves to relay data between the UE A and the base station. Here, the UE A may be a source and/or destination of the data.

Such UE relay can improve the transmission capacity of UE at a cell boundary, and also enhance the frequency use efficiency of a whole cell through frequency reuse.

The above-described direct communication and UE relay communication require a D2D link in common. A D2D link denotes a cellular communication method in which sets of UE belonging to the same cell or different cells exchange data through direct communication between them without passing through a network.

In the case of the direct communication between UE, only a D2D link is established between two sets of UE. In the case of the UE relay communication, a cellular link is established between the base station and the relay UE (UE B), and a D2D link is established between the relay UE (UE B) and the end UE (UE A).

To enable such direct communication between UE and UE relay communication in a current cellular communication system, problems relating to a HARQ and adaptive wireless transmission method between UE performing transmission and reception through a D2D link, etc. need to be solved.

SUMMARY

Accordingly, example embodiments of the present invention are provided to substantially obviate one or more problems due to limitations and disadvantages of the related art.

Example embodiments of the present invention provide a method of processing hybrid automatic repeat request (HARQ) and adaptive transmission of a device-to-device (D2D) link when D2D link communication is performed using one of an uplink band and a downlink band in a time-division duplex (TDD) cellular communication system or frequency-division duplex (FDD) cellular communication system.

Example embodiments of the present invention also provide a method of processing HARQ and adaptive transmission of a D2D link when D2D link communication is performed using both an uplink band and a downlink band in an FDD cellular communication system.

In some example embodiments, an operation method of UE constituting a method of processing HARQ and adaptive transmission of a D2D link when D2D link communication is performed using one of an uplink band and a downlink band in a TDD cellular communication system or an FDD cellular communication system, includes: (a) receiving an initial transmission mode (TM) and transmission power for the D2D link from a base station, and performing data transmission through the D2D link; (b) determining, at the UE, a TM and transmission power of a succeeding subframe, or receiving a TM control value and a transmission power control value from counterpart UE of the D2D link and determining the TM and the transmission power of the succeeding subframe; and (c) performing the data transmission to the counterpart UE using the determined TM and transmission power. Here, (b) and (c) are repeated.

The UE may determine a modulation and coding scheme (MCS) level for the data transmission to the counterpart UE using channel reciprocity without receiving channel state information (CSI) from the counterpart UE.

The TM control value and the transmission power control value may be continuously received from the counterpart UE at given periods, or received only when the TM and the transmission power need to be changed.

The TM control value and the transmission power control value may be received through a different channel than received data, or included in the received data according to a piggyback scheme and received.

(b) may include changing the TM and the transmission power when the counterpart UE repeatedly fails in receiving data transmitted in (c) a predetermined number of times or more during a predetermined time period.

The operation method may further include (d) requesting the base station to replace the D2D link with the counterpart UE with a cellular link when the counterpart UE repeatedly fails in receiving data transmitted in (c) a predetermined number of times or more during a predetermined time period.

When the UE is legacy UE only capable of transmission through the uplink band and reception through the downlink band, the UE may receive an acknowledgement (ACK) or a non-acknowledgement (NACK) of data transmitted in (c) from the counterpart UE via the base station.

When the counterpart UE is legacy UE only capable of transmission through the uplink band and reception through the downlink band, the UE may receive an ACK or a NACK of data transmitted in (c) through an uplink control channel transmitted by the counterpart UE.

In other example embodiments, an operation method of UE constituting a method of processing HARQ and adaptive transmission of a D2D link when D2D link communication is performed using both an uplink band and a downlink band in an FDD cellular communication system, includes: (a) receiving an initial TM and transmission power for the D2D link from a base station, and performing data transmission through the D2D link; (b) determining, at the UE, a TM and transmission power of a succeeding subframe, or receiving a TM control value and a transmission power control value from counterpart UE of the D2D link and determining the TM and the transmission power of the succeeding subframe; (c) receiving, at the UE, CSI from the counterpart UE, and determining an MCS level of the succeeding subframe on the basis of the received CSI; and (d) modulating and coding data according to the determined MCS level, and transmitting the modulated and coded data to the counterpart UE using the determined TM and transmission power. Here, (b), (c) and (d) are repeated.

The TM control value and the transmission power control value may be continuously received from the counterpart UE at given periods, or received only when the TM and the transmission power need to be changed.

The CSI may be continuously received from the counterpart UE at given periods, or received only when the CSI changes from previously received CSI.

At least one of the TM control value, the transmission power control value, and the CSI may be received through a different channel than the received data, or included in the received data according to a piggyback scheme and received.

(b) may include changing the TM and the transmission power when the counterpart UE repeatedly fails in receiving the data transmitted in (d) a predetermined number of times or more during a predetermined time period.

(c) may include changing the MCS level when the counterpart UE repeatedly fails in receiving the data transmitted in (d) a predetermined number of times or more during a predetermined time period.

The operation method may further include (e) requesting the base station to replace the D2D link with the counterpart UE with a cellular link when the counterpart UE repeatedly fails in receiving the data transmitted in (d) a predetermined number of times or more during a predetermined time period.

When the UE is legacy UE only capable of transmission through the uplink band and reception through the downlink band, the UE may receive an ACK or a NACK of the data transmitted in (d) from the counterpart UE via the base station.

When the counterpart UE is legacy UE only capable of transmission through the uplink band and reception through the downlink band, the UE may receive an ACK or a NACK of the data transmitted in (d) through an uplink control channel transmitted by the counterpart UE.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
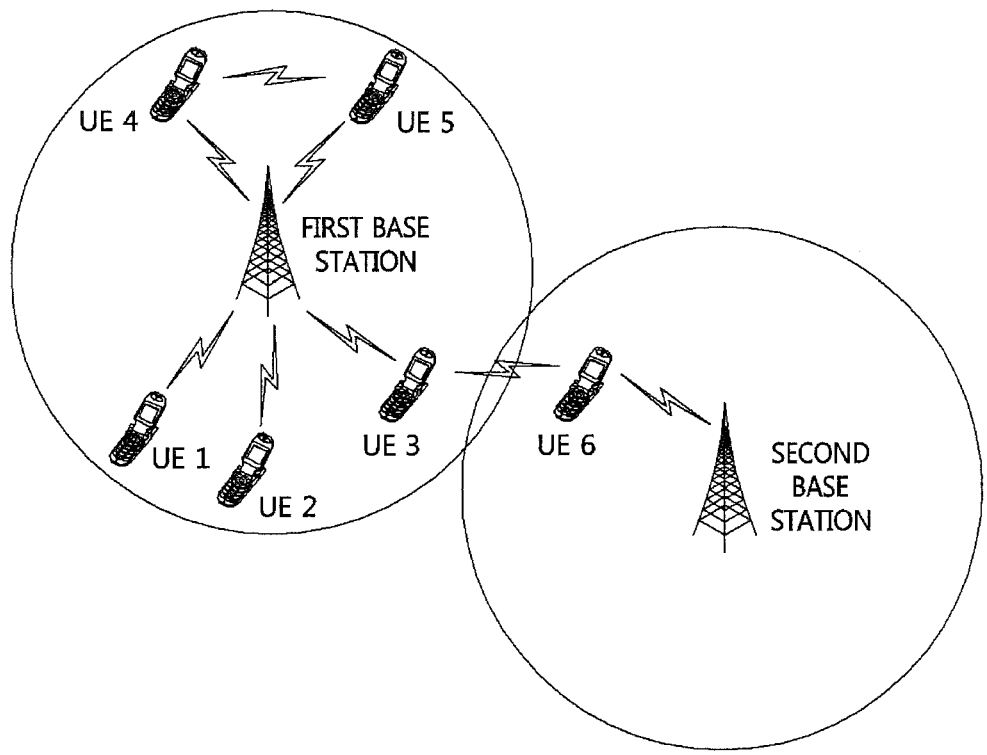
FIG. 1 is a conceptual diagram of device-to-device (D2D) communication.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" with another element, it can be directly connected or coupled with the other element or intervening elements may be present. In contrast, when an element is referred to as being "directly connected" or "directly coupled" with another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular fauns "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "user equipment (UE)" used herein may be referred to as a mobile station (MS), user terminal (UT), wireless terminal, access terminal (AT), terminal, subscriber unit, subscriber station (SS), wireless device, wireless communication device, wireless transmit/receive unit (WTRU), mobile node, mobile, or other teens.

The term "base station" used herein generally denotes a fixed point communicating with UE, and may be referred to as a Node-B, evolved Node-B (eNB), base transceiver system (BTS), access point (AP), and other teens. Also, at least one cell may exist at one base station, and one cell may include at least one sector.

Hereinafter, example embodiments of the present invention will be described in detail with reference to the appended drawings. To aid in understating the present invention, like numbers refer to like elements throughout the description of the figures, and the description of the same component will not be reiterated.

FIG. 1 is a conceptual diagram of direct communication between UE that is a purpose of the present invention.

Referring to FIG. 1, a cellular communication network includes a first base station and a second base station. While UE 1 to UE 3 belonging to a cell generated by the first base station perform communication using a general access link through the first base station, UE 4 and UE 5 belonging to the first base station directly perform data transmission and reception with each other without passing through a base station.

Various discussions may be made on a user case in which such direct communication between UE can be efficiently used. For example, direct communication between UE may be used in a local media server that provides a large amount of data (e.g., programs of a rock concert, and information on a musician) to participants at a rock concert and so on. Here, respective sets of UE connect to a serving cell and perform telephone communication, Internet access, etc. using an existing cellular link. The respective sets of UE may directly receive the above-mentioned large amount of data from the local media server operating as a counterpart of D2D communication according to a D2D scheme.

Meanwhile, referring back to FIG. 1, a D2D link is established not only between UE having the same cell as a serving cell but also between UE having different cells as serving cells. For example, the UE 3 belonging to the first base station may perform D2D communication with the UE 6 belonging to the second base station.

Figure 2:
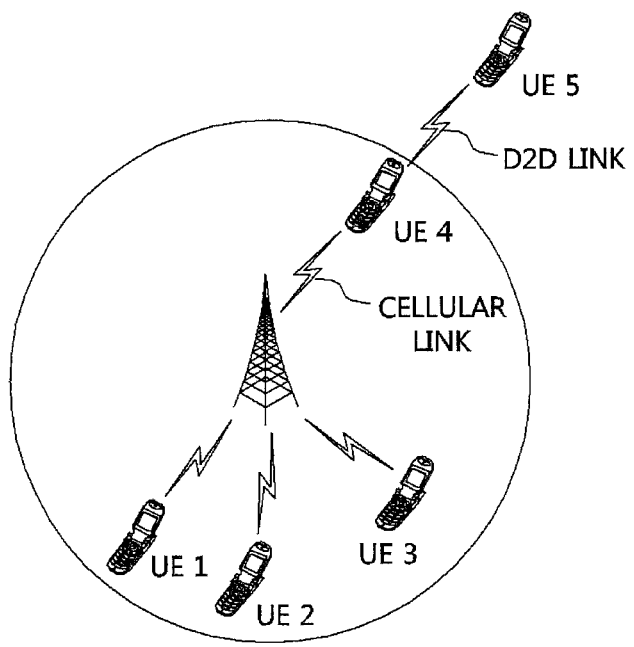
FIG. 2 is a conceptual diagram of user equipment (UE) relay.

FIG. 2 is a conceptual diagram of UE relay communication that is a purpose of the present invention.

Referring to FIG. 2, UE 1 to UE 3 belonging to a cell generated by a first base station perform communication using a general access link through the first base station, while UE 4 belonging to the first base station operates as a relay for UE 5. Data transmitted from the base station to the UE 5 and data transmitted from the UE 5 to the base station is relayed by the UE 4. In this way, overall relay is performed through a cellular link between a base station and UE (relay UE) serving as a relay and a D2D link between the relay UE and UE receiving a relay service (end UE).

Such UE relay can improve the transmission capacity of UE at a cell boundary, and also enhance the frequency use efficiency of a whole cell through frequency reuse in a D2D link.

A direct communication method between UE and a relay method of UE according to example embodiments of the present invention described below are based on all cases in which sets of UE performing direct communication between UE and UE relay communication belong to the same cell or different cells. Here, the sets of UE performing direct communication between UE and UE relay communication are controlled by serving cells thereof to perform data transmission and reception with counterpart UE, and adjacent cell base stations cooperate through information exchange.

Some or all of UE communicating with each other using a D2D link may be UE (i.e., new UE) capable of recognizing that a direct communication target of the UE itself is not a base station but UE, and some may be UE (i.e., legacy UE) that cannot recognize that a direct communication target of the UE itself is UE. New UE denotes UE capable of uplink reception and/or downlink transmission as well as general uplink transmission and downlink reception in a cellular communication system, and legacy UE denotes UE capable of uplink transmission and downlink reception only, like conventional UE.

The following techniques cover both a D2D link between new UE and a D2D link between new UE and legacy UE.

The present invention relates to a method of processing hybrid automatic repeat request (HARQ) and adaptive transmission between UE that are communicating through a D2D link. First, a method of configuring a subframe applied to a D2D link to process HARQ and adaptive transmission of D2D communication, and transmission of control information (acknowledgement/non-acknowledgement (ACK/NACK), channel quality information (CQI), a precoding matrix indicator (PMI), and a rank indicator (RI)) between UE required to process HARQ and adaptive transmission will be described.

Method of Configuring Subframe of D2D Link

A method of configuring a subframe of a D2D link described below is based on a Patent Cooperation Treaty (PCT) application (PCT/KR2011/003614) filed in advance by the present applicant, and the PCT application may be referred to to aid in understanding the present invention. In FIGS. 3 to 10 described below, a horizontal axis denotes time, and a vertical axis denotes frequency.

A method of configuring a subframe used in a D2D link may be separately described according to a case in which communication through the D2D link is applied to a time-division duplex (TDD) cellular communication system, and a case in which communication through the D2D link is applied to a frequency-division duplex (FDD) cellular communication system. In particular, the case in which communication through the D2D link is applied to an FDD cellular communication system may be divided again into a case in which communication through the D2D link is performed according to a method similar to that of a TDD system using only one of an uplink band and a downlink band constituting the FDD system, and a case in which communication through the D2D link is performed using both the uplink band and the downlink band. Thus, description below will be separately made according to a case (1) in which D2D link communication is performed using one of an uplink band and a downlink band in a TDD system or an FDD system, and a case (2) in which D2D link communication is performed using both an uplink band and a downlink band in an FDD system.

(1) Case of Performing D2D Link Communication Using Only One of Uplink Band and Downlink Band in TDD System or FDD System In a first method, only a unidirectional link is configured in one subframe.

Specifically, in the case of a TDD system or when only one of an uplink band and a downlink band is used in an FDD system, it is possible to separately configure a subframe transmitted from UE A and received by UE B and a subframe transmitted from the UE B and received by the UE A in the time axis. In other words, it is possible to refer to the configuration shown in FIG. 3, which will be described later.

In a second method, a bidirectional link is configured in one subframe.

Specifically, in the case of a TDD system or when only one of an uplink band and a downlink band is used in an FDD system, it is possible to separately configure a part transmitted from UE A and received by UE B and a part transmitted from the UE B and received by the UE A in one subframe. In other words, it is possible to refer to the configuration shown in FIG. 7, which will be described later.

(2) Case of Performing D2D Link Communication Using Both Uplink Band and Downlink Band in FDD System In a first case, only a unidirectional transmission is performed in the same subframe time period.

Specifically, both an uplink band and a downlink band are used in an FDD system. Here, the uplink band is configured to allow transmission from UE A and reception by UE B, and the downlink band is configured to allow transmission from the UE B and reception by the UE A. However, in this case, only one of transmission from the UE A and reception by the UE B through the uplink band and transmission from the UE B and reception by the UE A through the downlink band is performed at the same point in time. It is possible to refer to the configuration shown in FIGS. 4 to 6, which will be described later.

In a second case, bidirectional transmission is performed in the same subframe time period.

Specifically, both an uplink band and a downlink band are used in an FDD system. Here, the uplink band is configured to allow transmission from UE A and reception by UE B, and the downlink band is configured to allow transmission from the UE B and reception by the UE A. In other words, transmission from the UE A and reception by the UE B and transmission from the UE B and reception by the UE A are performed at the same point in time. It is possible to refer to the configuration shown in FIGS. 8 to 10, which will be described later.

Method of Transmitting Control Information between UE Communicating Through D2D Link Control information may be transferred between UE communicating through a D2D link using the following methods.

In a first method, a control channel separated from data may be configured using allocated resources and transmitted. In other words, a method of configuring a control channel separated from data using radio resources or a transmission method and transmitting the control channel may be used.

In a second method, control information may be included in data to be transmitted using allocated resources according to a piggyback scheme and transmitted. In general, compared to data, a low modulation order and a high coding rate are applied to control information to prevent reception failure. However, when control information is transmitted with data, such differential application is impossible, and a detailed countermeasure for reception failure is needed. The countermeasure for reception failure will be described later.

Meanwhile, control information denotes channel state information (CSI) including ACK/NACK information, CQI, a PMI and an RI, and control values for controlling a transmission mode (TM) and transmission power.

Method of Processing Adaptive Transmission of D2D Link

In a first method, a base station determines and notifies initial maximum transmission power for a D2D link to UE. A base station also determines and notifies an initial TM to UE, and thereafter D2D UE may determine a TM according to control information exchanged between the two sets of UE and change a TM.

As classified in the above-described method of configuring a subframe of a D2D link, a method of processing adaptive transmission of a D2D link according to an exemplary embodiment of the present invention will be separately described below according to a case (1) in which D2D link communication is performed using one of an uplink band and a downlink band in a TDD system or an FDD system, and a case (2) in which D2D link communication is performed using both an uplink band and a downlink band in an FDD system.

Figure 3:
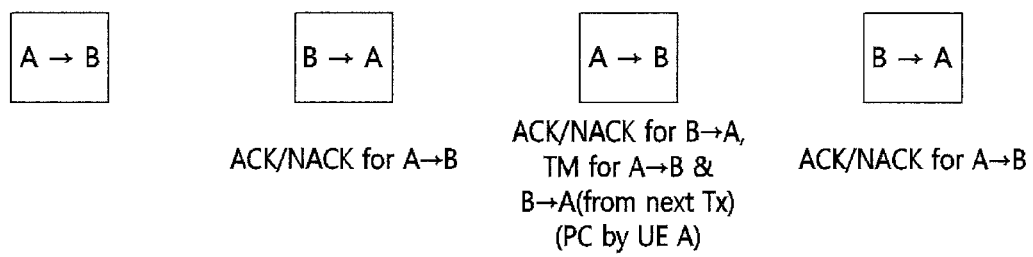
FIG. 3 is a conceptual diagram illustrating an example embodiment of adaptive transmission in which a unidirectional link is configured in each subframe in a time-division duplex (TDD) system or when only one of an upstream frequency and a downstream frequency is used in a frequency-division duplex (FDD) system.

(1) Case of Performing D2D Link Communication Using Only One of Uplink Band and Downlink Band in TDD System or FDD System FIG. 3 is a conceptual diagram illustrating an example embodiment of adaptive transmission in which a unidirectional link is configured in each subframe in a TDD system or when only one of an upstream frequency and a downstream frequency is used in an FDD system.

In this case, use of channel reciprocity may eliminate or considerably reduce the need to report CSI (CQI, a PMI and an RI). Here, one set of UE (e.g., UE requesting connection of a D2D link) among UE performing D2D communication may determine and transfer TM and transmission power control values to counterpart UE. Here, TM and transmission power control values may be continuously transferred, or transferred only when a change occurs.

Figure 7:
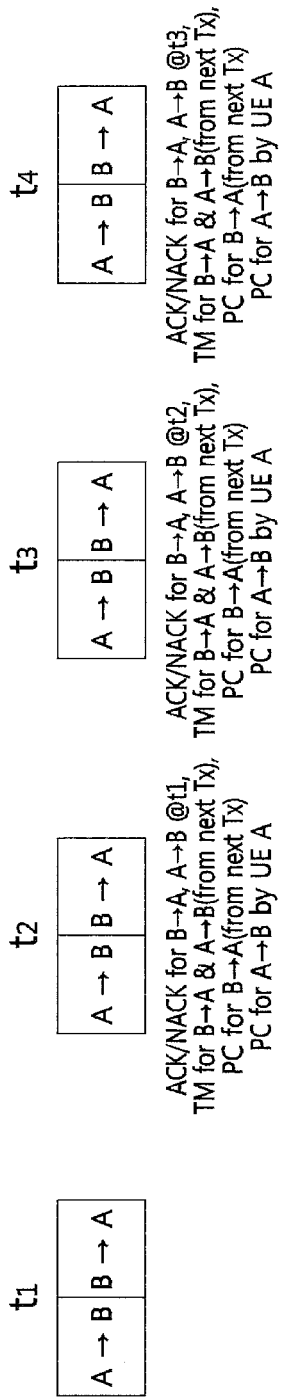
FIG. 7 is a conceptual diagram illustrating an example embodiment of adaptive transmission in which a bidirectional link is configured in each subframe in a TDD system or when only one of an upstream frequency and a downstream frequency is used in an FDD system.

FIG. 7 is a conceptual diagram illustrating an example embodiment of adaptive transmission in which a bidirectional link is configured in each subframe in a TDD system or when only one of an upstream frequency and a downstream frequency is used in an FDD system.

In this case, use of channel reciprocity may eliminate or considerably reduce the need to report CSI (CQI, a PMI and an RI). Here, one set of UE (e.g., UE requesting connection) among UE performing D2D communication may determine and transfer TM and transmission power control values to counterpart UE. Here, TM and transmission power control values may be continuously transferred, or transferred only when a change occurs.

(2) Case of Performing D2D Link Communication Using Both Uplink Band and Downlink Band in FDD System First, cases (shown as examples in FIGS. 4, 5 and 6) in which only unidirectional transmission is performed in the same subframe time period will be described.

Figure 4:
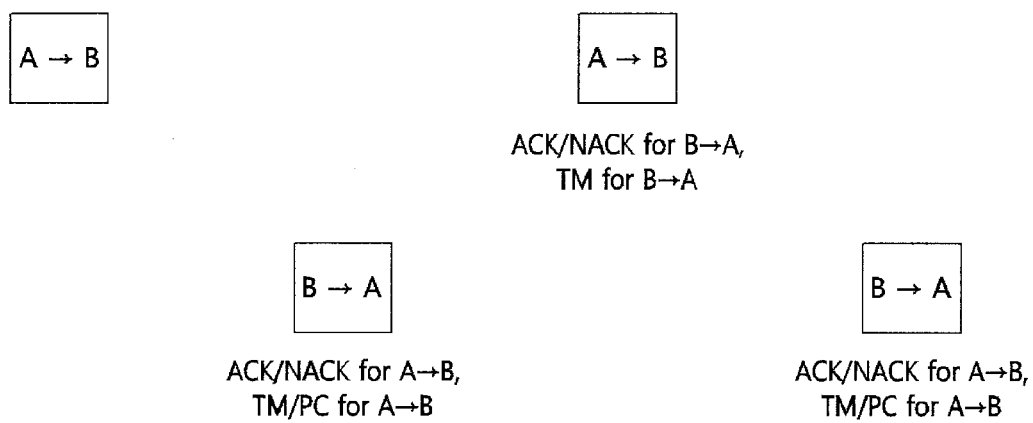
FIGS. 4 to 6 are conceptual diagrams illustrating example embodiments of adaptive transmission when a unidirectional link is configured in each subframe, and both upstream and downstream frequencies are used in an FDD system.

FIG. 4 is a conceptual diagram illustrating an example embodiment of adaptive transmission when a unidirectional link is configured in each subframe, and both upstream and downstream frequencies are used in an FDD system.

In this case, a receiver side may determine and transfer TM and transmission power control values (410) to a transmitter side. Here, TM and transmission power control values may be continuously transferred, or transferred only when a change occurs. In the case illustrated in FIG. 4, control information for CSI (CQI, a PMI, an RI, and so on) is not exchanged between UE participating in a D2D link.

Figure 5:
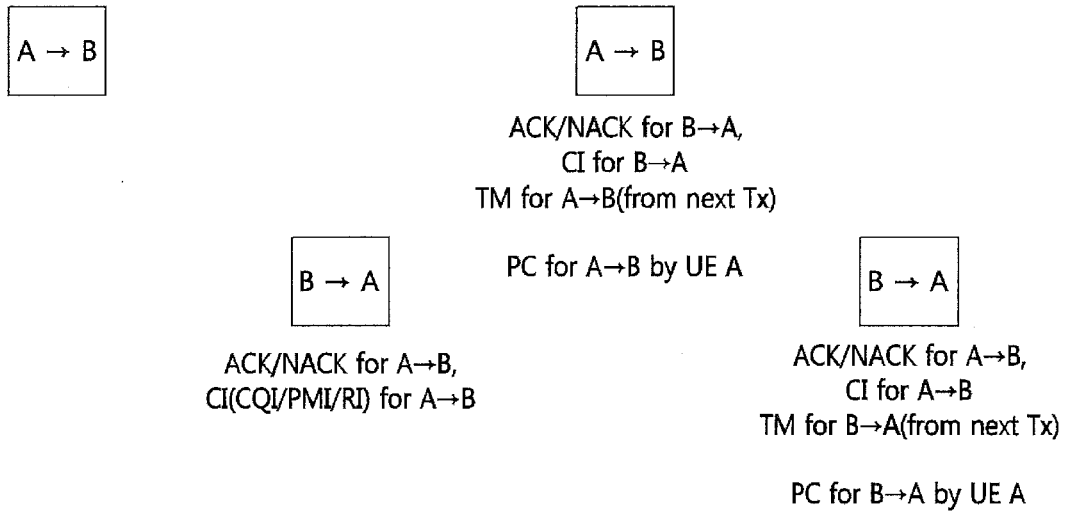

FIG. 5 is a conceptual diagram illustrating another example embodiment of adaptive transmission when a unidirectional link is configured in each subframe, and both upstream and downstream frequencies are used in an FDD system.

In this case, a transmitter side may determine and transfer a TM, and determine and execute a transmission power control value. Unlike the case illustrated as an example in FIG. 4, CSI (CQI, a PMI, and an RI) is transferred from the transmitter side to a receiver side in the case illustrated as an example in FIG. 5. Here, CSI (CQI, a PMI, and an RI) and a TM may be continuously transferred, or transferred only when a change occurs.

Figure 6:
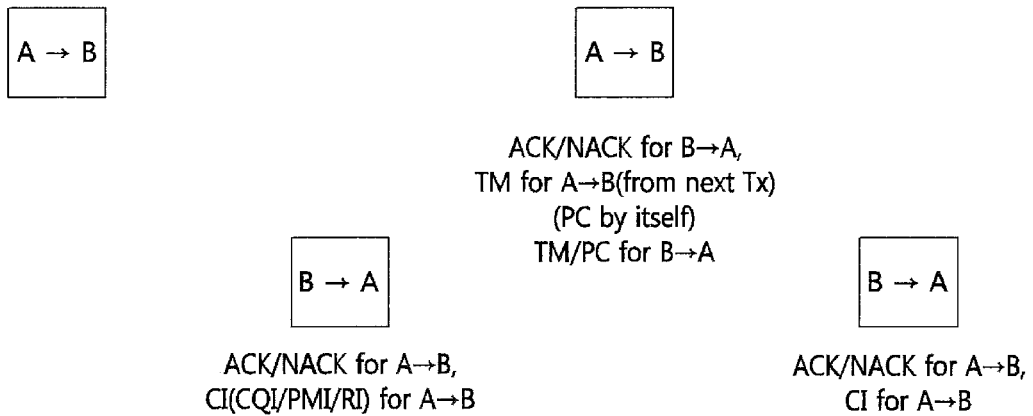

FIG. 6 is a conceptual diagram illustrating still another example embodiment of adaptive transmission when a unidirectional link is configured in each subframe, and both upstream and downstream frequencies are used in an FDD system.

In this case, UE requesting connection may determine and transfer a TM and a transmission power control value to counterpart UE. Here, CSI (CQI, a PMI, and an RI) and a TM may be continuously transferred, or transferred only when a change occurs.

Next, cases (shown as examples in FIGS. 8, 9 and 10) in which bidirectional transmission is performed in the same subframe time period will be described.

Figure 8:
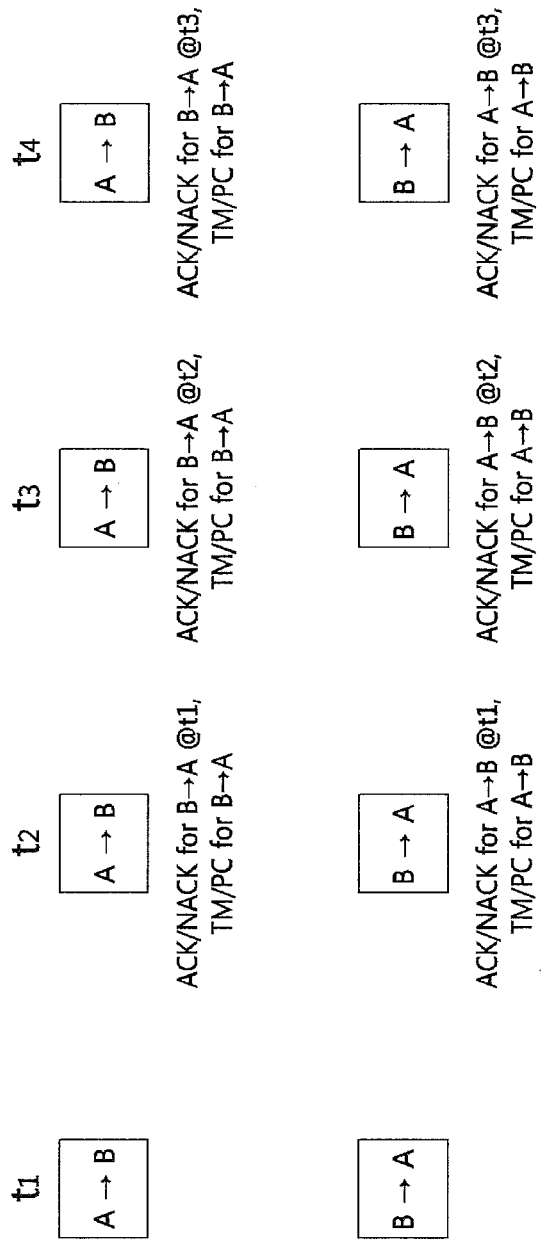
FIGS. 8 to 10 are conceptual diagrams illustrating example embodiments of adaptive transmission when a bidirectional link is configured in each subframe, and FDD communication is performed using both upstream and downstream frequencies in an FDD system.

FIG. 8 is a conceptual diagram illustrating an example embodiment of adaptive transmission when a bidirectional link is configured in each subframe, and FDD communication is performed using both upstream and downstream frequencies in an FDD system.

In this case, a receiver side may determine and transfer TM and transmission power control values to a transmitter side. Here, TM and transmission power control values may be continuously transferred, or transferred only when a change occurs.

Figure 9:
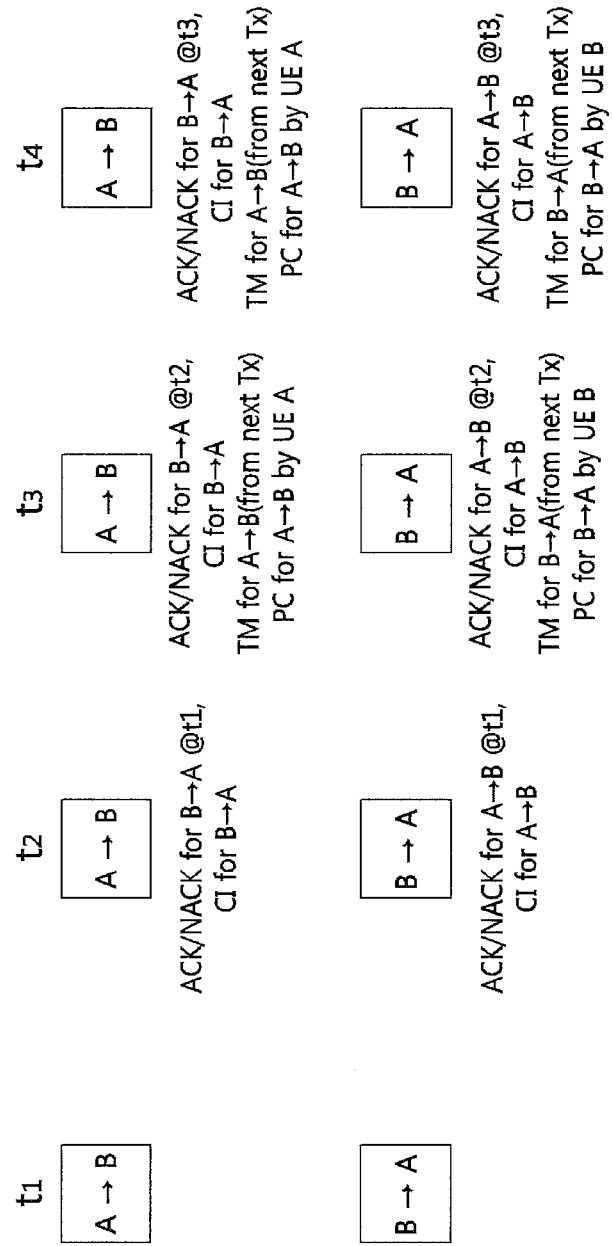

FIG. 9 is a conceptual diagram illustrating another example embodiment of adaptive transmission when a bidirectional link is configured in each subframe, and FDD communication is performed using both upstream and downstream frequencies in an FDD system.

In this case, a transmitter side may determine and transfer a TM, and determine and execute a transmission power control value. Here, CSI (CQI, a PMI, and an RI) and a TM may be continuously transferred, or transferred only when a change occurs.

Figure 10:
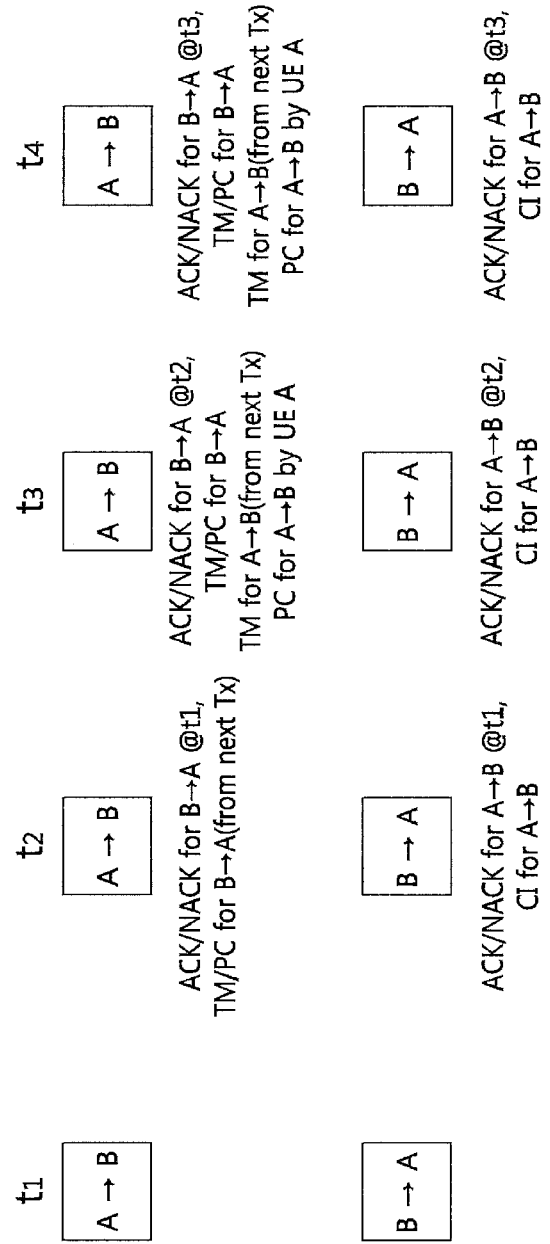

FIG. 10 is a conceptual diagram illustrating still another example embodiment of adaptive transmission when a bidirectional link is configured in each subframe, and FDD communication is performed using both upstream and downstream frequencies in an FDD system.

In this case, UE requesting connection may determine and transfer a TM and a transmission power control value to counterpart UE. Here, CSI (CQI, a PMI, and an RI) and a TM may be continuously transferred, or transferred only when a change occurs.

Countermeasure for Failure of Receiving Control Information

As a HARQ method for a D2D link, a synchronous HARQ scheme may be basically used. Here, when retransmission packet 1 is not received but retransmission packet 2 is received in in-sequence delivery, reordering of HARQ transmission packets is processed in layer 2. Also, when delivery failure occurs a predetermined number of times or more in retransmission, a more robust TM, transmission power, modulation order, and coding rate may be automatically determined according to a predetermined rule.

(1) Case of Using Uplink Band or Downlink Band in TDD System or FDD System

In this case, bidirectional link transmission is performed using one of an uplink band and a downlink band, and thus both of opposite direction links have the same channel characteristic.

Here, when a control channel is configured and transmitted separately from data, reception of control information may fail in succession, which indicates that it has become impossible to perform D2D link communication through the channel between two sets of UE due to movement of the UE, and so on. Thus, when transmission and reception of control information fails a predetermined number of times or more, it may be necessary to request a base station to switch from D2D link communication to cellular link communication. The request for switch to a cellular link may be made by one or both of the UE communicating through a D2D link.

Next, when a control channel is transmitted in user data according to the piggyback scheme, reception failure may continue a predetermined number of times or more. In this case, TM and transmission power control values of two sets of UE may be changed to predetermined values for both of opposite direction links. At this time, the TM and transmission power control values may be changed to more robust values or the most robust values.

When reception failure continues even if the TM and transmission power control values are changed, a base station may be requested to switch to a cellular link. Here, the request for switch to a cellular link may be may be made by one set or both sets of the UE communicating through a D2D link.

(2) Case of Using Both Uplink Band and Downlink Band in FDD System

In this case, bidirectional link transmission is performed using different bands of an uplink and a downlink, and thus both of the opposite direction links have different channel characteristics.

Here, when a control channel is configured and transmitted separately from data, reception of control information may fail in succession, which indicates that it has become impossible to perform D2D communication through the link between two sets of UE due to movement of the UE, and so on. Thus, when transmission and reception of control information fails a predetermined number of times or more, it may be necessary to request a base station to switch from D2D communication to a cellular link. The request for switch to a cellular link may be made by one or both of the UE performing D2D communication.

Next, when a control channel is transmitted in user data according to the piggyback scheme, a case in which one direction link has a poor characteristic and a case in which both of opposite direction links have poor characteristics may be separately taken into consideration.

First, the case in which one direction link (e.g., a link from UE B to UE A) has a poor characteristic may correspond to a case in which the UE A continuously fails in reception and the UE B continuously receives an NACK and performs retransmission. Here, when reception failure continues a predetermined number of times or more, the UE B may increase transmission power according to a predetermined rule. When reception failure continues the predetermined number of times or more even if transmission is performed with the maximum permissible power, the TM of the UE B needs to be changed to a more robust transmission mode according to the predetermined rule.

Next, the case in which both of opposite direction links (e.g., a link from the UE A to the UE B, and the link from the UE B to the UE A) have poor characteristics may correspond to a case in which both sets of UE continuously fail in reception. When reception failure continues a predetermined number of times or more, each set of the UE may increase transmission power according to a predetermined rule. When reception failure continues the predetermined number of times or more even if transmission is performed with the maximum permissible power, a transmission TM of the UE B and a reception TM of the UE A need to be changed according to the predetermined rule.

HARQ and Link Adaptation Processing When One Side of D2D Communication is Legacy UE While new UE is capable of transmission and reception through a downlink band and transmission and reception through an uplink band, legacy UE is only capable of transmission through an uplink band and reception through a downlink band. Thus, legacy UE can transmit ACK/NACK information through only an uplink band, and receive ACK/NACK information through only a downlink band.

First, a method of processing HARQ when transmission from legacy UE to new UE is performed through a D2D link will be described.

In this case, it may be impossible for the new UE to transmit a physical HARQ indicator channel (PHICH) to the legacy UE because PHICH resources may overlap cell-specific reference signal (CRS) resources. Thus, the new UE may report an ACK/NACK of D2D transmission from the legacy UE to a base station, and the base station may transfer the ACK/NACK to the legacy UE.

When the probability of reception failure of D2D communication is not high, error correction may be performed through an ARQ process upon failure. For example, such configuration may be applied to D2D communication in which error correction is not immediately needed, or a case in which coding and modulation rates of D2D communication are conservative.

Next, a method of processing HARQ when D2D link transmission from new UE to legacy UE is performed will be described.

The new UE may transmit an ACK/NACK through a physical uplink control channel (PUCCH). At this time, the transmission power level of the PUCCH through which the ACK/NACK is transmitted and that of a physical uplink shared channel (PUSCH) through which data is transmitted may be separately controlled to reduce the probability of interference caused by a PUCCH transmitted by a base station. For example, the PUCCH may be transmitted at a low level for a D2D link, and the PUSCH may be transmitted at a level for a cellular link.

Using the above-described methods of processing HARQ and adaptive transmission for D2D communication according to example embodiments of the present invention, it is possible to apply HARQ and adaptive transmission to a D2D communication link, so that the capacity and performance of D2D communication can be improved.

While the example embodiments of the present invention and their advantages have been described in detail, it should be understood that various changes, substitutions and alterations may be made herein without departing from the scope of the invention.

What is claimed is:

1. A method of processing hybrid automatic repeat request (HARQ) and adaptive transmission of a device-to-device (D2D) link when D2D link communication is performed in a time-division duplex (TDD) cellular communication system or a frequency-division duplex (FDD) cellular communication system using one of an uplink band and a downlink band, wherein an operation method of user equipment (UE) comprises:
   (a) receiving an initial transmission mode (TM) and transmission power for the D2D link from a base station, and performing data transmission through the D2D link;
   (b) determining, at the UE, a TM and transmission power of a succeeding subframe, or receiving a TM control value and a transmission power control value from counterpart UE of the D2D link and determining the TM and the transmission power of the succeeding subframe, the TM control value and the transmission power control value being continuously received from the counterpart UE at given periods or received only the TM and the transmission power need to be changed;
   (c) performing the data transmission to the counterpart UE using the determined TM and transmission power,
   wherein (b) and (c) are repeated; and
   (d) requesting the base station to replace the D2D link with the counterpart UE with a cellular link when the counterpart UE repeatedly fails in receiving data transmitted in (c) a predetermined number of times or more during a predetermined time period.

2. The method of claim 1, wherein the UE determines a modulation and coding scheme (MCS) level for the data transmission to the counterpart UE using channel reciprocity without receiving channel state information (CSI) from the counterpart UE.

3. The method of claim 1, wherein the TM control value and the transmission power control value are received through a different channel than received data, or included in the received data according to a piggyback scheme and received.

4. The method of claim 1, wherein (b) includes changing the TM and the transmission power when the counterpart UE repeatedly fails in receiving data transmitted in (c) a predetermined number of times or more during a predetermined time period.

5. The method of claim 1, wherein, when the UE is legacy UE only capable of transmission through the uplink band and reception through the downlink band, the UE receives an acknowledgement (ACK) or a non-acknowledgement (NACK) of data transmitted in (c) from the counterpart UE via the base station.

6. The method of claim 1, wherein, when the counterpart UE is legacy UE only capable of transmission through the uplink band and reception through the downlink band, the UE receives an acknowledgement (ACK) or a non-acknowledgement (NACK) of data transmitted in (c) through an uplink control channel transmitted by the counterpart UE.

7. A method of processing hybrid automatic repeat request (HARQ) and adaptive transmission of a device-to-device (D2D) link when D2D link communication is performed using both an uplink band and a downlink band in a frequency-division duplex (FDD) cellular communication system, wherein an operation method of user equipment (UE) comprises:

(a) receiving an initial transmission mode (TM) and transmission power for the D2D link from a base station, and performing data transmission through the D2D link;
(b) determining, at the UE, a TM and transmission power of a succeeding subframe, or receiving a TM control value and a transmission power control value from counterpart UE of the D2D link and determining the TM and the transmission power of the succeeding subframe, the TM control value and the transmission power control value being continuously received from the counterpart UE at given periods of received only when the TM and the transmission power need to be changed;
(c) receiving, at the UE, channel state information (CSI) from the counterpart UE, and determining a modulation and coding scheme (MCS) level of the succeeding subframe on the basis of the received CSI;
(d) modulating and coding data according to the determined MCS level, and transmitting the modulated and coded data to the counterpart UE using the determined TM and transmission power,
wherein (b), (c) and (d) are repeated; and
(e) requesting the base station to replace the D2D link with the counterpart UE with a cellular link when the counterpart UE repeatedly fails in receiving the data transmitted in (d) a predetermined number of times or more during a predetermined time period.

8. The method of claim 7, wherein the CSI is continuously received from the counterpart UE at given periods, or received only when the CSI changes from previously received CSI.

9. The method of claim 7, wherein at least one of the TM control value, the transmission power control value, and the CSI is received through a different channel than the received data, or included in the received data according to a piggyback scheme and received.

10. The method of claim 7, wherein (b) includes changing the TM and the transmission power when the counterpart UE repeatedly fails in receiving the data transmitted in (d) a predetermined number of times or more during a predetermined time period.

11. The method of claim 7, wherein (c) includes changing the MCS level when the counterpart UE repeatedly fails in receiving the data transmitted in (d) a predetermined number of times or more during a predetermined time period.

12. The method of claim 7, wherein, when the UE is legacy UE only capable of transmission through the uplink band and reception through the downlink band, the UE receives an acknowledgement (ACK) or a non-acknowledgement (NACK) of the data transmitted in (d) from the counterpart UE via the base station.

13. The method of claim 7, wherein, when the counterpart UE is legacy UE only capable of transmission through the uplink band and reception through the downlink band, the UE receives an acknowledgement (ACK) or a non-acknowledgement (NACK) of the data transmitted in (d) through an uplink control channel transmitted by the counterpart UE.

* * * * *